US012640949B1

(12) United States Patent
Almuhammadi

(10) Patent No.: US 12,640,949 B1
(45) Date of Patent: May 26, 2026

(54) METHOD AND SYSTEM FOR SECURING POST-QUANTUM BLOCKCHAINS

(71) Applicant: King Fahd University of Petroleum and Minerals, Dhahran (SA)

(72) Inventor: Sultan Ahmad Almuhammadi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/404,287

(22) Filed: Dec. 1, 2025

(51) Int. Cl.
| | |
|---|---|
| *H04L 9/00* | (2022.01) |
| *H04L 9/32* | (2006.01) |
| *H04L 9/40* | (2022.01) |
| *G06N 10/20* | (2022.01) |
| *G06N 10/80* | (2022.01) |

(52) U.S. Cl.
CPC .............. *H04L 9/50* (2022.05); *H04L 9/3247* (2013.01); *H04L 9/3249* (2013.01); *H04L 63/12* (2013.01); *G06N 10/20* (2022.01); *G06N 10/80* (2022.01)

(58) Field of Classification Search
CPC ....... H04L 9/32; H04L 9/3247; H04L 9/3249; H04L 9/3252; H04L 9/50; H04L 63/12; H04L 63/14; H04L 63/1441; H04L 63/1416; G06N 10/20; G06N 10/80
See application file for complete search history.

(56) References Cited

U.S. PATENT DOCUMENTS

| | | | | |
|---|---|---|---|---|
| 11,784,795 | B2 * | 10/2023 | Ragan ................. | H04L 63/0435 |
| | | | | 713/153 |
| 2023/0262126 | A1 * | 8/2023 | Liu ........................... | H04L 9/50 |
| | | | | 709/203 |
| 2025/0119277 | A1 * | 4/2025 | Khanna ..................... | H04L 9/50 |
| 2025/0190966 | A1 * | 6/2025 | Gutierrez-Sheris .... | G06Q 20/20 |

OTHER PUBLICATIONS

A Secure Scheme Based on a Hybrid of Classical Quantum Communications for Managing Classical Blockchains (Year: 2023).*

(Continued)

*Primary Examiner* — Shaqueal D Wade-Wright
(74) *Attorney, Agent, or Firm* — Oblon, McClelland, Maier & Neustadt, L.L.P.

(57) ABSTRACT

A system and method are provided for transitioning a distributed ledger or blockchain to a post-quantum authorization through a soft fork that avoids interruption or delay of network operation including defining a first activation block height (h1) to initiate the transition and a second activation block height (h2) greater than the first activation block height to complete the transition. For each block during the transition, transactions are validated by applying a height-based rule set that enforces a classical digital signature scheme before the first activation block height, permits both classical and post-quantum digital signature schemes between the first and second activation heights while requiring post-quantum authorization for newly created ledger units and enforces only post-quantum authorization after the second activation height. At the second activation height, all ledger units authorized under the classical digital signature (Continued)

800

Define a first activation block height (h1) to initiate a soft fork and a second activation block height (h2) greater than the first activation block height ⟩— 802

Validate, for each block (b) at height H, each transaction in the block (b) by applying a height-based rule set that comprises ⟩— 804

Validate, when H<h1, that each input ledger unit referenced by the transaction is authorized under a classical digital signature scheme ⟩— 806

Validatie, when h1≤H≤h2, that each input ledger unit referenced by the transaction is authorized under either the classical digital signature scheme or a post-quantum digital signature scheme and validating that each output ledger unit created by the transaction is authorized under the post-quantum digital signature scheme ⟩— 808

Validate, when H>h2, that each input ledger unit referenced by the transaction is authorized under the post-quantum digital signature scheme ⟩— 810

Commit the block (b) to the distributed ledger when each transaction in the block satisfies the height-based rule set or rejecting the block (b) otherwise ⟩— 812 scheme become invalid, resulting in a distributed ledger operating exclusively under post-quantum authorization.

20 Claims, 9 Drawing Sheets

(56)                    References Cited

OTHER PUBLICATIONS

PQFabric A Permission Blockchain Secure form Both Classical and Quantum Attacks (Year: 2021).*

Robert Campbell, "Post-Quantum Security for Bitcoin and Ethereum: A Comprehensive Migration Framework", Preprints.org, Aug. 22, 2025 2025081672, 14 pages.

Adnan Masood; "Quantum Sundays |9) Q-day Countdown: Quantum Threats to Blockchain Cryptography and the Strategic Rewriting of Digital-Asset Security", Apr. 20, 2025, 75 pages.

Jameson Lopp, "Against Allowing Quantum recovery of bitcoin", Cypherpunk Cogitations, Mar. 16, 2025, 23 pages.

* cited by examiner

Block [i - 2]                Block [i - 1]                Block [i]

Original              Mixed Blockchain
Blockchain          (QNR and QR Coins)          QR Blockchain Grace Period

1000

METHOD AND SYSTEM FOR SECURING POST-QUANTUM BLOCKCHAINS

BACKGROUND

Technical Field

The present disclosure is directed to blockchain systems and, more particularly, to a transitioning protocol for migrating distributed ledgers to post-quantum authorization.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years, blockchain technology has evolved rapidly. Currently, blockchains are used in cryptocurrency, supply chains, government services, military, defense systems, secure smart systems, Internet of Things, and healthcare etc. Despite its robust design, blockchain is not immune to security threats. The security of the blockchain depends on the security of the underlying cryptographic algorithms they are built on, such as hash functions and digital signatures. The digital signatures are used for authenticating transactions in blockchain applications and hash functions are used for securely linking the blocks with each other in the blockchain. The recent development of quantum computers threatens both hash functions and public-key cryptography. The quantum computers are capable of recovering sensitive transaction data, such as the private key in public-key cryptosystems to launch attacks on public-key cryptography.

Currently, most of blockchains such as bitcoin use elliptic-curve digital signature algorithm (ECDSA) and Rivest-Shamir-Adleman (RSA) for transaction authorization. The ECDSA is better than the RSA, as it uses a shorter key to achieve the same security level. Blockchains based on RSA and ECDSA are vulnerable to quantum attacks because these algorithms rely on mathematical problems such as integer factorization and the discrete logarithm problem (DLP) that can be efficiently solved using a quantum computer. This threatens the integrity of digital signatures used to authenticate transactions, potentially allowing attackers with quantum capabilities to forge signatures and compromise blockchain security.

In addition to digital signatures, blockchain technology uses hash functions to securely link blocks to each other, which makes the blockchain immutable. FIG. 1 illustrates linking of each block to its previous block based on hash values. To add a new block (say Block [i]) to the blockchain, the previous block (Block [i−1]) is hashed, and the hash value of Block [i−1] is stored in Block [i]. Furthermore, Block [i−1] also contains a previous hash that stores the hash value of Block [i−2], and so on. If any part of Block [i−2] is modified, its hash value will change, and therefore the hash value stored in Block [i−1] will no longer be valid and must be updated as well. When several blocks are added after a given block, it is extremely difficult to modify it without being detected and makes the whole blockchain tamper-evident.

A number of post-quantum cryptographic schemes such as code-based, hash-based, super singular elliptic curve isogeny-based, lattice-based, and multivariate have been developed to replace the current cryptographic schemes. Although hash-based digital signatures are quantum-safe schemes, their performance limitations make them impractical. Another algorithm can be used to achieve quadratic speedup of the search for hash codes. This enables attackers equipped with quantum computers to successfully launch the 51% attack on the blockchain. However, the effect of such algorithms on hash functions is quadratic. The quantum attacks on hash-based systems can be resisted by doubling the sizes of keys.

The blockchains for the existing cryptocurrencies are classified into two groups: (1) blockchains vulnerable to quantum attacks, and (2) blockchains that are secure against quantum attacks. First, the blockchains that are vulnerable to quantum attacks include: Ethereum (ETH), Bitcoin (BTC), Tether (USDT), Binance (BNB), Solana (SOL), Litecoin (LTC), and Zcash (ZEC). Most of the blockchains in this group use ECDSA or similar DLP-based digital signatures, which a quantum computer can solve in polynomial time. In this group, several cryptocurrencies, including Beam, Grin, and Monero, employ various signature schemes to achieve additional features. A modified version of ECDSA, known as Edwards-Curve Digital Signature Algorithm (EdDSA) is also based on DLP which is also not quantum-safe. The EdDSA is used in Binance, Solana, and Monero. However, they are all vulnerable to quantum attacks because they are all based on elliptic curve DLP. On the other hand, blockchains that can resist quantum attacks include: IOTA (MIOTA), Nexus (NXS), Cellframe (CELL), HyperCash (HC), Mochimo (MCM), and Quantum Resistant Ledger (QRL). These blockchains use lattice-based and hash-based digital signatures which are quantum-resistant.

The Ring Confidential Transactions (RingCT) is a digital signature scheme for obfuscating the public ledger and making the transaction untraceable. It hides both the amount sent and the sender's public key. In this scheme, any peers can broadcast or send transactions, and it is impossible for an outside observer to determine who sent them. This scheme is used in Monero, Beam, and Grin to make the transaction untraceable. But, these schemes are vulnerable to quantum attacks as they are built on EdDSA and RingCT signatures.

Winternitz One-Time Signature (WOTS) is a quantum-safe hash-based digital signature used in IOTA to secure transactions. Another variant of WOTS known as WOTS+ is used in Quantum Resistant Ledger and Mochimo to provide extra security features such as transaction mirroring and three-way handshaking. CURL-P is a hash-based digital signature which employs ternary hardware instead of binary to give Internet of Things Application (IOTA) additional security against quantum attacks.

The extended Merkle Signature Scheme (XMSS) is a hash-based signature scheme which is used to establish an extendable stateful asymmetrical hypertree signature methodology for Quantum Resistant Ledger (QRL). XMSS+, a modified version of XMSS scheme is used in Mochimo to provide extra security. The Signature Chains scheme, used in Nexus blockchain, incorporates quantum-safe cryptographic schemes to achieve high security against quantum attacks. Ring Learning with Errors (Ring LWE), a lattice based signature, provides high security against quantum attacks to HyperCash (HC) blockchain.

The multi-signatures scheme, used in Cellframe and new Ethereum 3.0, provides security against quantum attacks. A 2-byte ID is introduced in Cellframe to support up to 65,536 digital signature algorithms, among which a lattice-based digital signature known as Crystal-Dilithium is selected by default. The multi-algorithm signatures can be used with more than one key to secure all of the deposits in the wallet.

Table 1 summarizes the digital signature schemes used in cryptocurrencies and indicates whether the cryptocurrency is quantum-safe or not based on the digital signature it uses. If the signature is based on discrete logarithm problem (DLP), such as ECDSA, EdDSA, and RingCT, then the cryptocurrency is not quantum-safe. Otherwise, if the signature is based on lattices or hash code, such as WOTS, CURL-P, LWE, Dilithium, and XMSS, then the cryptocurrency is quantum-safe.

TABLE 1

| Signature | Cryptocurrencies | Quantum-safe? |
|---|---|---|
| ECDSA | Ethereum, Bitcoin, Tether, Zcash, Litecoin, Beam, Grin | No |
| EdDSA | Binance, Solana, Monero | No |
| RingCT | Monero, Beam, Grin | No |
| WOTS | IOTA | Yes |
| WOTS+ | Q. R. Ledger, Mochimo | Yes |
| CURL-P | IOTA (Future Plan) | Yes |
| XMSS | Quantum Resistant Ledger | Yes |
| XMSS+ | Mochimo | Yes |
| Signature Chains | Nexus | Yes |
| Ring LWE | HyperCash | Yes |
| Crystal-Dilithium | Cellframe | Yes |
| Multi-Signature | Cellframe, Ethereum 3.0 | Yes |

Transition protocols are defined using either a soft or a hard fork of the blockchains. Both hard forks and soft forks are similar in the sense that when an existing code of a cryptocurrency is updated, the old version remains on the network while the new version is created. With a hard fork, both the new and the old blockchains coexist at the same time. While in a soft fork, only the new blockchain will remain valid after the update.

A transition protocol based on a commit-delay-reveal scheme uses soft fork and works even if the digital signature is compromised. This protocol is safe but slow due to the delay in the underlying commit-delay-reveal scheme. This scheme requires waiting for a period of time after the commitment is made, then it reveals the proof of the ownership of assets. This makes the protocol slow and impractical since it requires the possession of quantum-resistant coins to fund the commitment transaction.

Another transition protocol that does not depend on commit-delay-scheme requires a hard fork instead of a soft fork. In this protocol, only transactions with ECDSA signatures are allowed as part of the current consensus before the block height of 555,000. The blockchain nodes such as Bitcoin nodes reject blocks containing transactions signed by XMSS. Further, the use of hard fork means that two blockchains run in parallel. The challenge in this transition protocol is to convince the majority of the peers to join the new blockchain. Peers might decline and stay in the old chain or join both chains to virtually double their assets.

Accordingly, it is one object of the present disclosure to provide methods and systems to provide security to blockchains against quantum attacks on hash functions and digital signatures. A secure transition protocol algorithm or method is required to safely and smoothly migrate existing blockchains to quantum-resistant blockchains.

SUMMARY

In an exemplary embodiment, a method for transitioning a distributed ledger (blockchain) to a post-quantum authorization is described. A first activation block height (h1) to initiate a soft fork and a second activation block height (h2) greater than the first activation block height are defined. For each block (b) at a block height H, each transaction in the block (b) is validated by applying a height-based rule set. When H<h1, a validation is performed that each input ledger unit referenced by the transaction is authorized under a classical digital signature scheme. When h1≤H<h2, a validation is performed that each input ledger unit referenced by the transaction is authorized under either the classical digital signature scheme or a post-quantum digital signature scheme. Similarly, a validation is performed that each output ledger unit created by the transaction is authorized under the post-quantum digital signature scheme. When H>h2, a validation is performed that each input ledger unit referenced by the transaction is authorized under the post-quantum digital signature scheme. The block (b) is committed to the distributed ledger when each transaction in the block satisfies the height-based rule set or the block (b) is rejected otherwise.

In another exemplary embodiment, a system for transitioning a distributed ledger (blockchain) to post-quantum authorization is described. The system comprises one or more processors and a memory storing instructions that are executed by the one or more processors. The execution of the instructions cause the system to define a first activation block height (h1) to initiate a soft fork and a second activation block height (h2) greater than the first activation block height. For each block (b) at a block height H, each transaction in the block (b) is validated by applying a height-based rule set. The rule set comprises validating, when H<h1, that each input ledger unit referenced by the transaction is authorized under a classical digital signature scheme. When h1≤H≤h2, a validation is performed that each input ledger unit referenced by the transaction is authorized under either the classical digital signature scheme or a post-quantum digital signature scheme. Further, another validation is performed that each output ledger unit created by the transaction is authorized under the post-quantum digital signature scheme. When H>h2, a validation is performed that each input ledger unit referenced by the transaction is authorized under the post-quantum digital signature scheme. The block (b) is committed to the distributed ledger when each transaction in the block satisfies the height-based rule set or the block is rejected otherwise.

In an aspect, each ledger unit, including an input ledger unit and an output ledger unit, comprises a blockchain-tracked unit including a digital coin or an application token.

In another aspect, the method further includes verifying for each input ledger unit of each transaction, that the input ledger unit is unspent on the distributed ledger before treating the transaction as valid.

In an aspect, the method includes determining whether a ledger unit is authorized under the classical digital signature scheme or the post-quantum digital signature scheme based on a block height at which the ledger unit was created relative to the first activation block height (h1).

In an aspect, each unspent ledger unit authorized under the classical digital signature scheme is treated as expired at block height h2 and each transaction that references an expired ledger unit as an input after block height h2 is rejected.

In an aspect, a block reward after block height h2 is adjusted by an amount corresponding to the expired ledger units authorized under the classical digital signature scheme.

In an aspect, an expected expiration date for ledger units authorized under the classical digital signature scheme is announced to a plurality of network peers. The expected expiration date is based on an expected date at which block height h2 is reached.

In an aspect, during h1≤H<h2, each ledger unit authorized under the classical digital signature scheme is converted into a ledger unit authorized under the post-quantum digital signature scheme by initiating a self-transfer to a post-quantum address.

In an aspect, the post-quantum digital signature scheme comprises one of a hash-based scheme, a lattice-based scheme, a code-based scheme, a multivariate scheme, and an isogeny-based scheme.

In an aspect, the method involves tracking non-currency application tokens and applying the height-based rule set to state updates representing at least one of supply-chain provenance, smart-contract state, e-government services, digital-identity credentials, and healthcare records.

In an aspect, the one or more processors are configured to verify, for each input ledger unit of each transaction, that the input ledger unit is unspent on the distributed ledger before treating the transaction as valid.

In another aspect, the one or more processors are configured to determine whether a ledger unit is authorized under the classical digital signature scheme or the post-quantum digital signature scheme based on a block height at which the ledger unit was created relative to the first activation block height (h1).

In one of the aspects, the one or more processors are configured to treat each unspent ledger unit authorized under the classical digital signature scheme as expired at block height h2 and reject each transaction that references an expired ledger unit as an input after block height h2.

In an aspect, the one or more processors are configured to adjust a block reward after block height h2 by an amount corresponding to the expired ledger units authorized under the classical digital signature scheme.

In an aspect, the one or more processors are configured to announce to a plurality of network peers an expected expiration date for ledger units authorized under the classical digital signature scheme, the expected expiration date being based on an expected date at which block height h2 is reached.

In an aspect, the one or more processors are further configured to convert, during h1≤H≤h2, each ledger unit authorized under the classical digital signature scheme into a ledger unit authorized under the post-quantum digital signature scheme by initiating a self-transfer to a post-quantum address.

In an aspect, the post-quantum digital signature scheme comprises one of a hash-based scheme, a lattice-based scheme, a code-based scheme, a multivariate scheme, and an isogeny-based scheme.

In an aspect, the one or more processors are configured to track non-currency application tokens and apply the height-based rule set to state updates representing at least one of supply-chain provenance, smart-contract state, e-government services, digital-identity credentials, and healthcare records.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
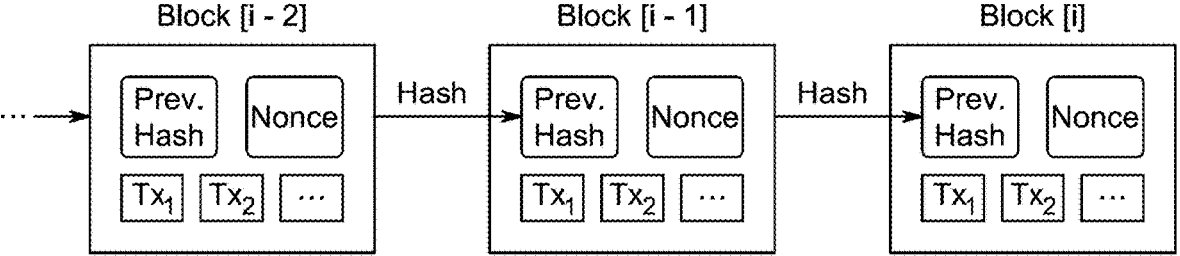
FIG. 1 illustrates linking of blocks in a blockchain based on hash values, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Further, as used herein, a 'ledger unit' means a blockchain-tracked unit (e.g., a coin or an application token).

Aspects of this disclosure are directed to a system, device, and method for transitioning a distributed ledger to a post-quantum authorization. A first activation block height (h1) to initiate a soft fork and a second activation block height (h2) greater than the first activation block height are defined. For each block (b) at a block height H, each transaction in the block (b) is validated by applying a height-based rule set. When H<h1, a validation is performed that each input ledger unit referenced by the transaction is authorized under a classical digital signature scheme. When h1≤H<h2, a validation is performed that each input ledger unit referenced by the transaction is authorized under either the classical digital signature scheme or a post-quantum digital signature scheme. Similarly, a validation is performed that each output ledger unit created by the transaction is authorized under the post-quantum digital signature scheme. When H>h2, a validation is performed that each input ledger unit referenced by the transaction is authorized under the post-quantum digital signature scheme. The block (b) is committed to the distributed ledger when each transaction in the block satisfies the height-based rule set or the block (b) is rejected otherwise.

The aspects of the disclosure present a soft fork transition solution without delay. The soft fork yields a single block-chain and all the peers stay on it. Removing the commit-delay scheme will allow the peers to continue processing the transaction without interruption, which makes presented transition protocol smooth and secure. The transition protocol can be used with any post-quantum digital signature and does not require any waiting time for the hard fork process.

The coins used in cryptocurrencies (or tokens used in other blockchain applications) that are generated by transactions done before he soft fork in the original blockchain are referred as quantum-non-resistant (QNR) coins. While the coins (or tokens) generated after the soft fork are called quantum-resistant (QR) coins.

Initially, the original blockchain contains only QNR coins. When the soft fork process starts at block height $h1$, the blockchain becomes a mixed blockchain that accepts both QNR and QR coins as an input, but only outputs QR coins in any transaction. The mixed blockchain allows a grace period for all peers to either spend their coins or convert them to the quantum-resistant version (QR coins). At the end of the grace period (block height $h2$), the blockchain becomes totally quantum-resistant and only accepts QR coins as an input.

Figure 2:
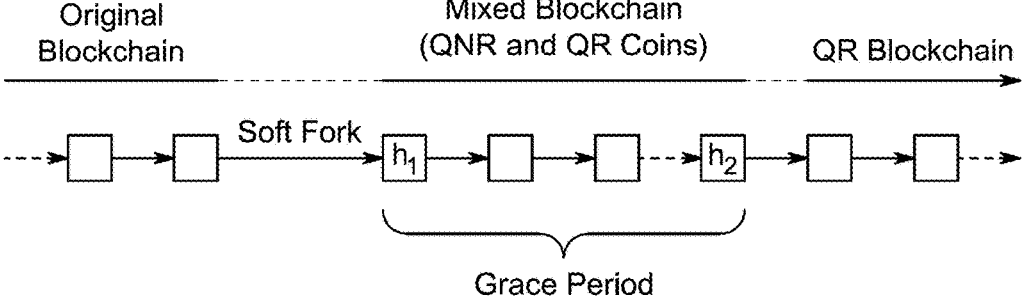
FIG. 2. Illustrates the use of a grace period in the transition protocol, according to certain embodiments.

FIG. 2 illustrates the grace period in the transition protocol presented in the disclosure. The transactions done during the grace period accept both QR and QNR ledger units or coins as input, and only generate QR ledger units or coins as output. While transactions done after the grace period only accept QR ledger units or coins as input and generate QR output.

The aspects of the present disclosure describe the rules of the transition protocol. All other rules of the distributed ledger or blockchain remain identical to the ones before the soft fork at block $h1$. The blockchain is used for cryptocurrency and a valid transaction contains valid ledger units or coins only that are not spent in previous blocks. If the blockchain is used for applications other than cryptocurrency, then valid transactions contain valid tokens only that are not used in previous blocks.

```
Rules: Transition Protocol
    Data: B : current blockchain,
        b : current block (height, transaction list),
            h1:block height to begin the fork,
            h2:height of the last block in the grace period.
    Result: Add b to the blockchain if valid.
    for all Tx ∈ b do:
    if height(b) < h1 then
        if all Tx.input are QNR and not spent then
        Mark Tx as valid
        else
            Mark Tx as invalid
        end
    else
        if height(b) ≤ h2 then
if all Tx.input are QR or QNR and not spent then
            Mark Tx as valid
            else
            Mark Tx as invalid
            end
        else
        if all Tx.input are QR and not spent then
            Mark Tx as valid
        else
            Mark Tx as invalid
```

-continued

```
        end
        end
    end
    end-for
    if all Tx ∈ b are valid then
        Add b to B
    else
        Reject b
    End
```

In an aspect, the grace period is configured to last at least two years to allow the peers enough time to spend their coins or convert them to new quantum-resistant coins by paying the coins to themselves in normal transactions. The grace period is also utilized to fix errors or address any critical issue that might appear in the migration process from the classical to the quantum-resistant blockchain. The coins that are not spent or converted to the QR version during the grace period are neither protected nor supported by the blockchain any longer. Such coins are burned and the mining reward is increased accordingly to maintain the total supply of the coin.

In an aspect, it is assumed that no quantum attack is possible before or during the grace period. The QNR ledger units or coins are safe to use before the end of the grace period and the QNR ledger units or coins are considered legitimate if the user holds the corresponding private key in the digital signature scheme. Similarly, the QR ledger units or coins are considered as secure against quantum attacks and are legitimate all the time if the user holds the corresponding private key of the coin in the quantum-resistant digital signature scheme. All accessible QNR ledger units or coins are used or converted to QR ledger units or coins during the grace period. If a QNR ledger units or coin is not used or converted to a QR ledger units or coin during the grace period, it is assumed to be inaccessible and will be counted as burned or expired and no longer legitimate in the blockchain. The expiration date of all QNR ledger units or coins is set to be the expected date of $h2$, and this expiration date is announced to all peers when the transition protocol is started.

In an exemplary embodiment, the transition protocol of the present disclosure is applied to Bitcoin blockchain to clarify the proposed transition protocol. All transactions occurring before the grace period are treated normally as in the original blockchain. A recommended block height to begin the fork for the Bitcoin blockchain is $h1=945,000$ which marks the beginning of the grace period. While the recommended height of the last block in the grace period is $h2=1,155,000$ which gives a four-year grace period.

Figure 3:
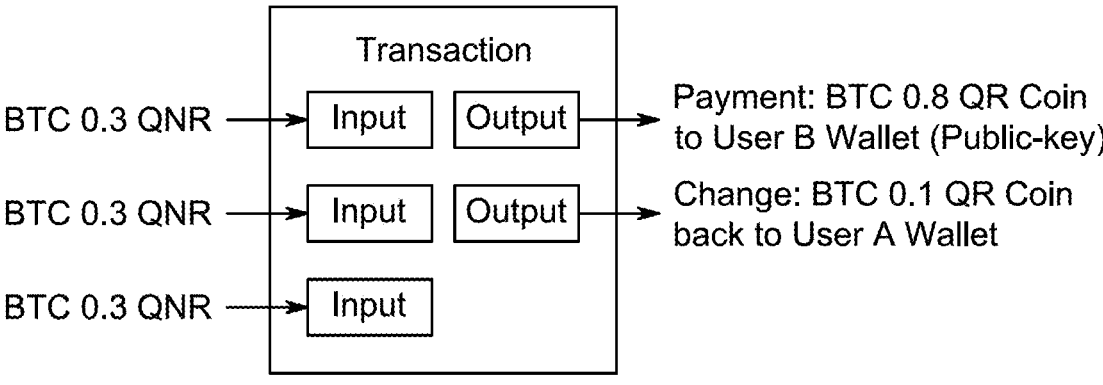
FIG. 3 illustrates an exemplary transaction performed during the grace period according, to certain embodiment.

In an exemplary embodiment, FIG. 3 illustrates a transaction performed during the grace period. A user A has BTC 0.9 in three QNR ledger units or coins of BTC 0.3 each. The user A obtained these coins in the original blockchain before the fork and the user A holds their private keys in ECDSA. Then, after the fork, the user A wants to pay BTC 0.8 to user B during the grace period. Since this happens during the grace period, the height of the block (b) that contains this transaction is between $h1$ and $h2$, say height (b)=945,001. According to Algorithm 1, since $h1<height (b)<h2$, the system first checks if these three ledger units or coins are not spent and they are either QR or QNR in order to validate the transaction, and then generates two QR ledger units or coins. The first ledger units or coin is for the payment in the amount of BTC 0.8 sent to user B's wallet (public key generated in the QR system). While the second coin is the change in the amount of BTC 0.1 sent back to user A's wallet. The algorithm adds the block b to the blockchain after confirming the validity of all transactions in b.

Figure 4:
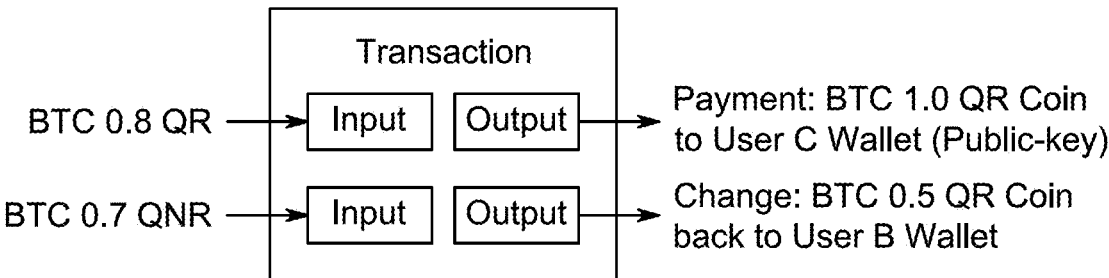
FIG. 4 illustrates another exemplary transaction performed during the grace period, according to certain embodiment.

In another exemplary embodiment, FIG. 4 illustrates another transaction performed during the grace period. The user B later intends to pay BTC 1.0 to user C during the grace period in a transaction included in a block of height 950,008. The user B uses the BTC 0.8 QR coin received from user A in addition to a BTC 0.7 QNR coin he already has. Since this transaction occurs during the grace period, the system accepts a mix of QR and QNR ledger units or coins in one transaction and creates two QR ledger units or coins for the payment and the change. The first ledger units or coin is for the payment in the amount of BTC 1.0 sent to user C's wallet (public key generated in the QR system). While the second ledger units or coin is the change in the amount of BTC 0.5 sent back to user B's wallet. The algorithm adds the block b to the blockchain after confirming the validity of all transactions in b.

Figure 5:
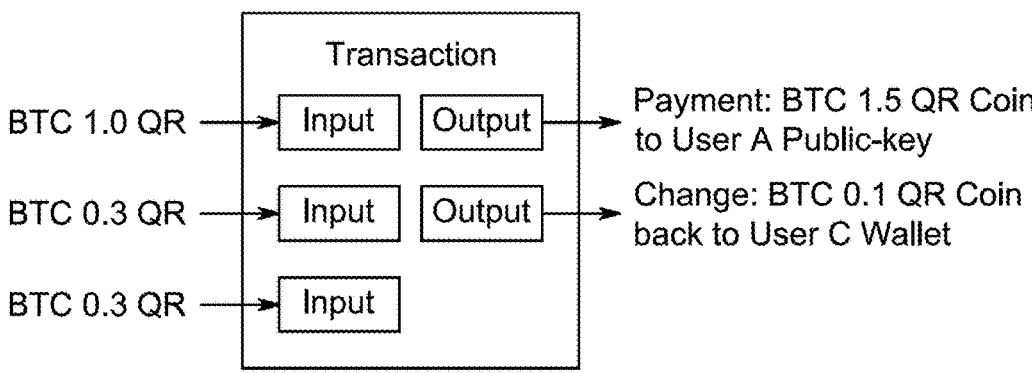
FIG. 5 illustrates another exemplary transaction performed during the grace period, according to certain embodiment.

In another exemplary embodiment, FIG. 5 illustrates another transaction performed after the grace period. The user C wants to pay BTC 1.5 to user A after the grace period using the BTC 1.0 QR coin from user B plus BTC 0.6 in two QR coins she has obtained recently. Since this transaction occurs after the grace period, the current block height is greater than $h2$, say height $(b)=1,155,001$. Therefore, the algorithm checks that all the input ledger units or coins in this transaction are QR in order to accept the transaction, and creates two QR ledger units or coins for the payment and the change as illustrated in FIG. 5. The first coin is for the payment in the amount of BTC 1.5 QR coin sent to user A's wallet (public key generated in the QR system). While the second coin is the change in the amount of BTC 0.1 QR coin sent back to user C's wallet. Then, the algorithm adds the block containing this transaction to the blockchain after confirming the validity of all other transactions.

On the other hand, if a user has a BTC 0.5 QNR ledger unit or coin obtained in the original blockchain, and wants to spend it after the grace period, the algorithm will reject this ledger unit or coin and mark the transaction as invalid. Only QR ledger unit or coins are accepted if height $(b)>h2$. Any block containing transactions using QNR ledger units or coins will be rejected. Consequently, the user can no longer use the BTC 0.5 QNR ledger unit or coin. This ledger unit or coin is assumed to be burned permanently at this point. Therefore, there is a risk of losses to valid users who do not convert their coins or tokens to the new QR coins during the grace period when the cryptocurrency migrates to the post-Quantum Blockchain.

Figure 6:
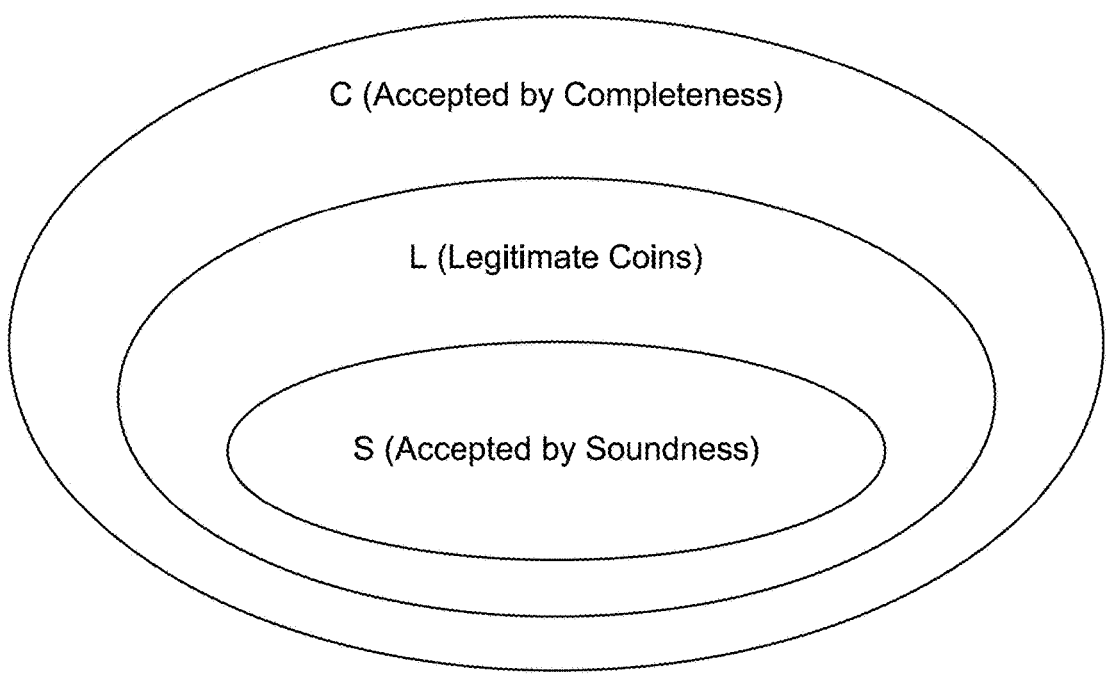
FIG. 6 illustrates the soundness and completeness of the transition protocol, according to certain embodiments.

FIG. 6 illustrates that the transition protocol presented in the disclosure is sound and complete. A rule is sound if it returns an output, that output is correct. In some exceptions, the sound algorithm does not give an output. An algorithm is complete if it always returns an output that is most likely correct but it could be bogus sometime. The terms soundness and completeness are well defined in the context of computational theory, where computing problems are represented as languages. A language is a set of strings on some alphabet. An algorithm is a function that determines whether a given string x belongs to some language or not by returning true or false respectively.

In an aspect, the soundness and completeness properties are formally defined. L is assumed to be a language on some alphabet $\Sigma$, and $\Sigma^*$ be the set of all strings on $\Sigma$.

Thus, $L \subseteq \Sigma^*$. Then, the soundness and completeness properties are defined as:

An algorithm A is said to be sound if $$\forall x \in \Sigma^*, A(x,L)=True \rightarrow x \in L$$

An algorithm A is said to be complete if $$\forall x \in X^*, x \in L \rightarrow A(x,L)=True$$

In the context of transition protocol algorithms, the soundness property means that if the algorithm accepts a ledger unit or coin in any transaction, then this coin is legitimate. The completeness property of the algorithm means that if a user has legitimate ledger units or coins, then the algorithm will accept them in any transaction that is made with only legitimate ledger units or coins. In other words, suppose that L is the set of all legitimate coins. Then a sound algorithm accepts a subset S of L. While a complete algorithm accepts a superset C of L. The FIG. 6 illustrates that $S \subseteq L \subseteq C$.

In an aspect, the algorithm accepts the whole set of legitimate ledger units or coins (by completeness property) and nothing else (by soundness property). If both legitimate and illegitimate ledger units or coins are used in a single transaction, then the algorithm does not accept the transaction. This does not violate the completeness property since not all coins in the transaction are legitimate.

In an exemplary embodiment, the user A spends a ledger unit (coin) $c1$ in transaction Tx1 and the algorithm 1 accepted it in block $b_i$. Then, there are two cases:

Case 1: height $(b_i)<h2$, which means that the transaction Tx1 is done before the end of the grace period. This implies that all the ledger units (coins) used in Tx1 are either QR or QNR. If $c1$ is a QR ledger unit (coin), then it is produced by the new algorithm with a quantum-safe digital signature, which implies that $c1 \in L$. If $c1$ is a QNR coin, then it is safe to be used under the assumption of no potential quantum attacks can accrue before or during the grace period, which also implies that $c1 \in L$.

Case 2: height $(b_i)>h2$, which means that the transaction Tx1 is done after the grace period. Therefore, $c1$ must be a QR ledger unit or coin produced by the new algorithm with a quantum-safe digital signature and it is safe to use it even if a large scale quantum computer exists, which implies $c1 \in L$.

Therefore, if Algorithm 1 accepts $c1$ in any a transaction, whether it occurs before, after, or during the grace period, then $c1$ is a legitimate ledger unit or coin.

In another embodiment, the user A has a legitimate ledger unit (coin) $c2$ and wants to spend it in some transaction, say Tx2, to be added in block $b3$. Then, there are three cases:

Case 1: Suppose the user A wants to spend the coin $c2$ before the grace period. Then, $c2$ must be a QNR coin since all coins are QNR in the original blockchain. Hence, Tx2 is added to block $b3$ with height $(b3)<h1$. Therefore, the algorithm will mark Tx2 as a valid transaction and accepts $c2$.

Case 2: If the user A wants to spend it during the grace period, then $c2$ can be either QNR or QR. Since $h1<$height $(b3)<h2$ in this case, the algorithm will mark Tx2 as a valid transaction and accept $c2$.

Case 3: If the user A wants to spend it after the grace period, then $c2$ must be a QR coin since all QNR coins are burned and no longer legitimate at this point. Hence, the algorithm accepts $c2$ and marks Tx2 as valid accordingly.

All legitimate coins are accepted by the rules in any transaction occurring before, during, or after the grace period.

Figure 7:
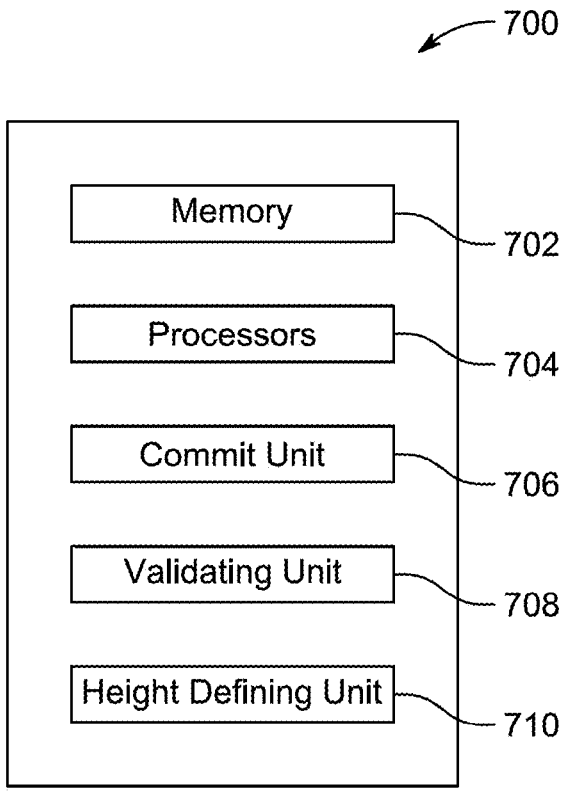
FIG. 7 illustrates a block diagram of a system implementing the transition protocol. according to certain embodiments

FIG. 7 illustrates a block diagram of a system 700 for implementing the transition protocol according to certain embodiments of the disclosure.

Referring to FIG. 7, in an embodiment, the system 700 includes one or more processor(s) 704. The one or more processor(s) 704 may be implemented as one or more microprocessors, microcomputers, microcontrollers, digital signal processors, central processing units, logic circuitries, and/or any devices that process data based on operational instructions. Among other capabilities, the one or more processor(s) 704 may be configured to fetch and execute computer-readable instructions stored in a memory 702 of the system 700. The memory 702 is configured to store one or more computer-readable instructions or routines in a non-transitory computer readable storage medium, which may be fetched and executed to create or share data packets over a network service. The memory 702 may include any non-transitory storage device including, for example, volatile memory such as random-access memory (RAM), or non-volatile memory such as erasable programmable read only memory (EPROM), flash memory, and the like.

In an aspect, the one or more processors 704 are configured to initiate transitioning a distributed ledger to post-quantum authorization. A height defining unit 710 defines a first activation block height (h1) to initiate a soft fork and a second activation block height (h2) greater than the first activation block height.

A validating unit 708 validates, for each block (b) at a block height H, each transaction in the block (b) by applying a height-based rule set. When H<h1, the validating unit 708 validates that each input ledger unit referenced by the transaction is authorized under a classical digital signature scheme. When h1≤H≤h2, the validating unit 708 validates that each input ledger unit referenced by the transaction is authorized under either the classical digital signature scheme or a post-quantum digital signature scheme and validating that each output ledger unit created by the transaction is authorized under the post-quantum digital signature scheme. When H>h2, the validating unit 708 validates that each input ledger unit referenced by the transaction is authorized under the post-quantum digital signature scheme.

A commit unit 706 commits the block (b) to the distributed ledger when each transaction in the block satisfies the height-based rule set or rejects the block otherwise.

Figure 8:
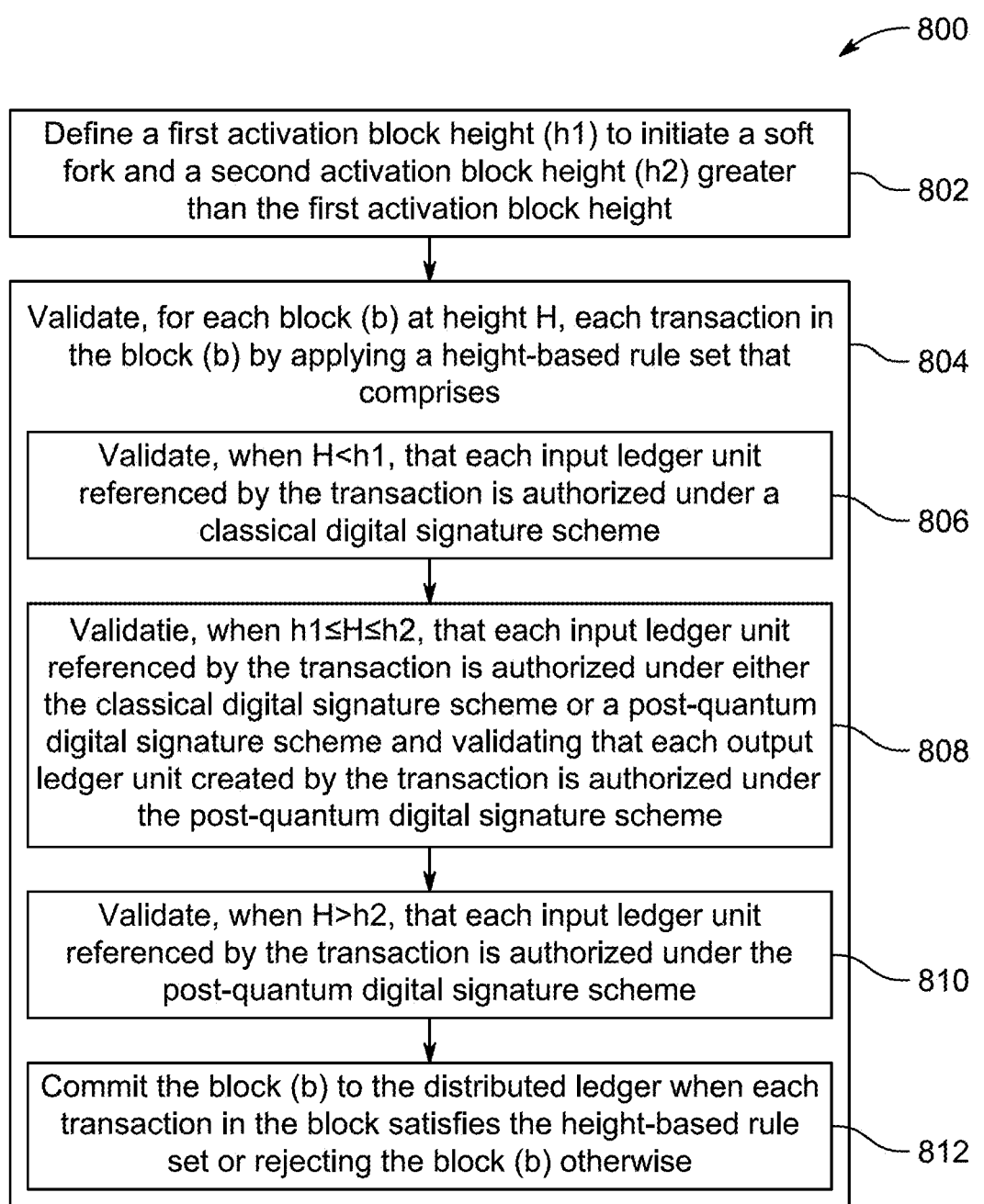
FIG. 8 illustrates a method for transitioning a blockchain to a post-quantum authorization, according to certain embodiments.

FIG. 8 illustrates a flowchart for a method 800 for transitioning a distributed ledger i.e. a blockchain to a post-quantum authorization. In the present disclosure, ledger unit and blockchain are used interchangeably. At step 802, a first activation block height (h1) to initiate a soft fork and a second activation block height (h2) greater than the first activation block height is defined. In an embodiment, the first height to initiate the soft fork for the Bitcoin blockchain is h1=945,000 which marks the beginning of the grace period. While the second height of the last block in the grace period is h2=1,155,000 which gives a four-year grace period.

At step 804, for each block (b) at a block height H, each transaction in the block (b) is validated by applying a height-based rule set. At step 806, when H<h1, a validation is performed that each input ledger unit referenced by the transaction is authorized under a classical digital signature scheme. The original blockchain contains only QNR coins.

At step 808, when h1≤H≤h2, a validation is performed that each input ledger unit referenced by the transaction is authorized under either the classical digital signature scheme or a post-quantum digital signature scheme. Further, another validation is performed that each output ledger unit created by the transaction is authorized under the post-quantum digital signature scheme. When the soft fork process starts at block height h1, the blockchain becomes a mixed blockchain that accepts both QNR and QR coins as an input, but only outputs QR coins in any transaction. The mixed blockchain allows a grace period for all peers to either spend their coins or convert them to the quantum-resistant version (QR coins).

For each input ledger unit of each transaction, the input ledger unit validated to be as unspent on the distributed ledger before treating the transaction as valid. Each unspent ledger unit authorized under the classical digital signature scheme is treated as expired at block height h2, and each transaction that references an expired ledger unit as an input is rejected after block height h2.

In an aspect, a block reward, or a financial incentive is given to miners or validators for successfully adding a new block of transactions to a blockchain, after block height h2 is adjusted by an amount corresponding to the expired ledger units authorized under the classical digital signature scheme.

At step 810, when H>h2, a validation is performed that each input ledger unit referenced by the transaction is authorized under the post-quantum digital signature scheme. At the end of the grace period (at block height h2), the blockchain becomes totally quantum-resistant and only accepts QR coins as an input. While transactions done after the grace period i.e., when H>h2, only accept QR coins as input and generate QR output.

At step 812, the block (b) is committed to the distributed ledger when each transaction in the block satisfies the height-based rule set or the block is rejected otherwise.

Each ledger unit comprises two primary components: an input ledger unit and an output ledger unit. These components are configured to facilitate the transfer, transformation, or utilization of blockchain-tracked digital assets.

The input ledger unit is operable to receive a blockchain-tracked unit, which may include a digital coin, an application token, or any other cryptographically verifiable digital asset. This unit ensures the integrity and authenticity of the incoming asset by validating its blockchain provenance and associated metadata.

The output ledger unit is configured to generate or transmit a corresponding blockchain-tracked unit, which may reflect a transformed, transferred, or newly issued digital coin or application token. The output ledger unit maintains a secure and immutable record of the transaction or transformation, ensuring traceability and compliance with blockchain protocols.

Each ledger unit operates within a distributed ledger environment, leveraging blockchain technology to ensure tamper-resistance, auditability, and decentralized verification of digital asset transactions. The system 700 may further include smart contract logic to automate conditional operations between input and output ledger units.

The soft fork transition of the present disclosure ensures seamless migration to quantum-resistant blockchains without network disruption. It eliminates delays while avoiding blockchain splits. The soft fork in the present disclosure allows an immediate transition without any waiting period. The transition protocol of the present disclosure ensures that all users remain on the same block chain instead of two chains running in parallel. The transactions remain uninterrupted during the grace period, thereby allows gradual adoption. The transition protocol of the present disclosure uses a grace period, where users can transition at their own pace, making it easier to implement. The transition protocol enables a direct transition without special prerequisites of initial possession of quantum-resistant coins for transactions. The protocol ensures that transactions remain uninterrupted during migration, making it more practical than the existing approaches. Moreover, the performance of the proposed transition protocol is highly effective and resilient. The proposed transition protocol maintains network stability, requires minimal computational overhead, and prevents inflation by burning unspent QNR coins post-transition. The proposed transition protocol offers high security, efficiency, and flexibility, making it an optimal solution for quantum-safe blockchain migration.

The following list shows the advantages of the present transition protocol compared to some examples of products and technologies currently available in market.

1. Bitcoin (BTC): Current blockchain uses ECDSA which is vulnerable to quantum attacks. The presented transition protocol allows secure migration to a post-quantum blockchain via soft fork, avoiding chain splits or coin duplication.

2. Ethereum (ETH): Migration to post-quantum signatures is not planned or practical. The transition protocol presented in the disclosure provides a grace-period-based transition without halting operations or requiring hard forks.

3. Zcash privacy coin (ZEC): Depends on zk-SNARKs with classical ECDSA base. The transition protocol presented in the disclosure supports mixed-coin networks, easing secure transition with minimal disruption.

4. Hyperledger Fabric (by IBM): It is used in supply chain, banking, food safety. It lacks post-quantum resilience. The transition protocol presented in the disclosure enables enterprise blockchains to adopt post-quantum cryptography without breaking continuity.

5. ToolChain (by VeChain): It is applied in luxury goods and carbon tracking. It does not have post-quantum roadmap. The transition protocol presented in the disclosure allows for secure upgrade without halting operations or reminting tokens.

6. KSI Blockchain (by Guardtime): It is used by governments and militaries (e.g., Estonia) for data integrity. The transition protocol presented in the disclosure ensures future-proofing critical systems against quantum threats with zero downtime.

7. Estonia e-Government: It is a critical infrastructure which depends on classical digital signatures. The transition protocol presented in the disclosure enables phased upgrade with security guarantees and audit consistency.

8. Luxury asset provenance (by Everledger): Data needs to remain verifiable for decades. The transition protocol presented in the disclosure ensures long-term trust in historical data as cryptography evolves.

9. MedRec Blockchain EHR system (by MIT): Medical records require long term protection. The soft-fork protocol supports incremental migration to quantum-safe signatures, ensuring compliance and integrity.

10. MediLedger (Pharma supply chain by Chronicled): It handles sensitive, regulated data. The transition protocol presented in the disclosure prevents disruption during transition, critical in pharma logistics and compliance.

The transition protocol presented in the present disclosure enables commercial products and services to be sold to each industry listed below:

Blockchain Security and Infrastructure: A software development kit (SDK) or modular software component configured to integrate with existing public or private blockchain networks. The module facilitates secure migration to post-quantum cryptographic algorithms via a soft-fork mechanism. The migration process ensures uninterrupted service and backward compatibility.

Cryptocurrency Wallets and Exchanges: A plugin or upgrade module for digital wallets, custodial services, and cryptocurrency exchanges. The module automatically converts user-held digital assets to quantum-resistant formats within the same address space. The conversion process preserves user access and transaction history.

Financial Technology (FinTech): A Blockchain Transition-as-a-Service (BTaaS) platform designed for financial institutions managing digital assets. The platform enables secure, compliant migration of transaction histories and asset holdings to post-quantum standards. The service includes audit trails and regulatory compliance features.

Government and e-Identity Systems: A secure update service for national identity systems and legal registries implemented on blockchain infrastructure. The service ensures long-term auditability and cryptographic integrity under post-quantum conditions. The update mechanism supports legal and administrative continuity.

Supply Chain Blockchain Providers: A quantum-resilient upgrade toolkit for decentralized logistics and supply chain networks. The toolkit enables secure transition without halting operations or disrupting smart contract execution. The upgrade process maintains traceability and contractual enforcement.

Healthcare Data Platforms: A secure migration engine for blockchain-based Electronic Health Record (EHR) systems. The engine ensures compliance with future quantum-resistant data privacy regulations. The migration preserves patient data integrity and access control mechanisms.

In an exemplary embodiment, the transition protocol is applied to the Bitcoin Blockchain which has a number of parameters as input. These parameters are used to make appropriate recommendations on the setup of this protocol. The recommended duration for the grace period depends on many factors related to the blockchain in question, like the block time, block reward, maximum supply, etc. For Bitcoin, for example, the recommended grace period duration is a four-year after launching the soft fork by the present transition protocol. This is long enough to allow all peers to migrate to the new post-quantum blockchain. During this grace period, there could be more than one soft fork or restart of the transition protocol to accommodate different updates.

In an embodiment, a number of parameter settings are recommended for Algorithm 1 applied to Bitcoin. The soft fork should start at the block height $h1=945,000$ in the Bitcoin blockchain. This is the first block number in the mixed blockchain. However, since this is the first block in the mixed blockchain, it will only have to take QNR coins as input and generate QR coins. Later blocks will have both QNR and QR coins as input and only generate QR coins as output. At the end of the grace period, the blockchain will be purely quantum-resistant and will accept only QR coins. All unspent QNR coins will be permanently burned, and their values should be returned to the maximum circulation supply of 21 million BTC. This will increase the mining reward in the next half-cycle. In case of Bitcoin, the mining reward is halved every 210,000 blocks (approximately 4 years). Since a four-year grace period is recommended for Bitcoin, the grace period will end at block height $h2=h1+210000=1,155,000$.

Figure 9:
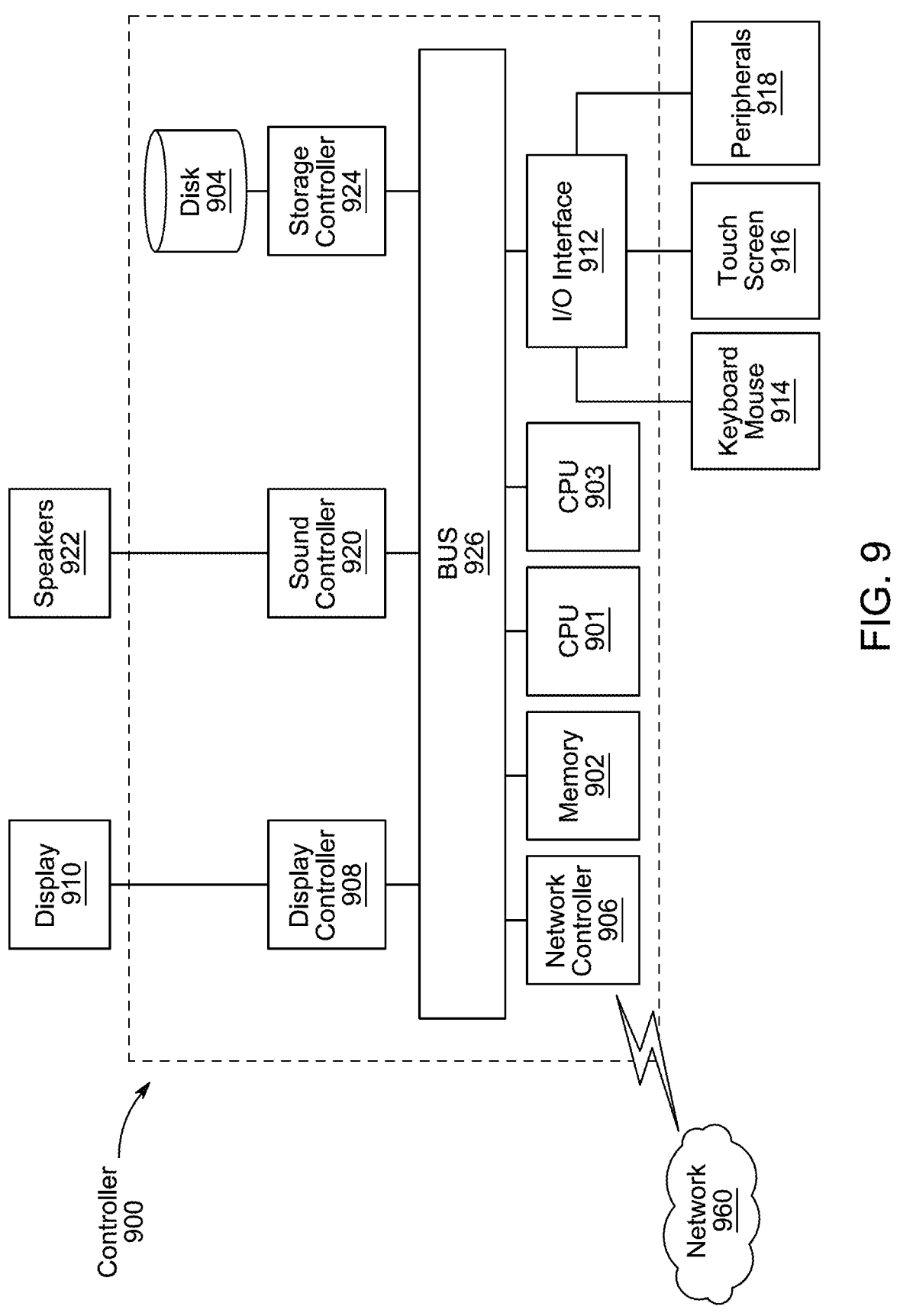
FIG. 9 is an illustration of a non-limiting example of details of computing hardware used in the computing system, according to certain embodiments.

Next, further details of the hardware description of the computing environment according to exemplary embodiments is described with reference to FIG. 9. In FIG. 9, a controller 900 is representative of the processing circuitry of FIG. 2 in which the controller 900 is a computing device which includes a CPU 901 which performs the processes described above/below. The process data and instructions may be stored in the memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN subnetworks. The network 960 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 908, such as a NVIDIA Geforce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general purpose storage controller 924 connects the storage medium disk 904 with a communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
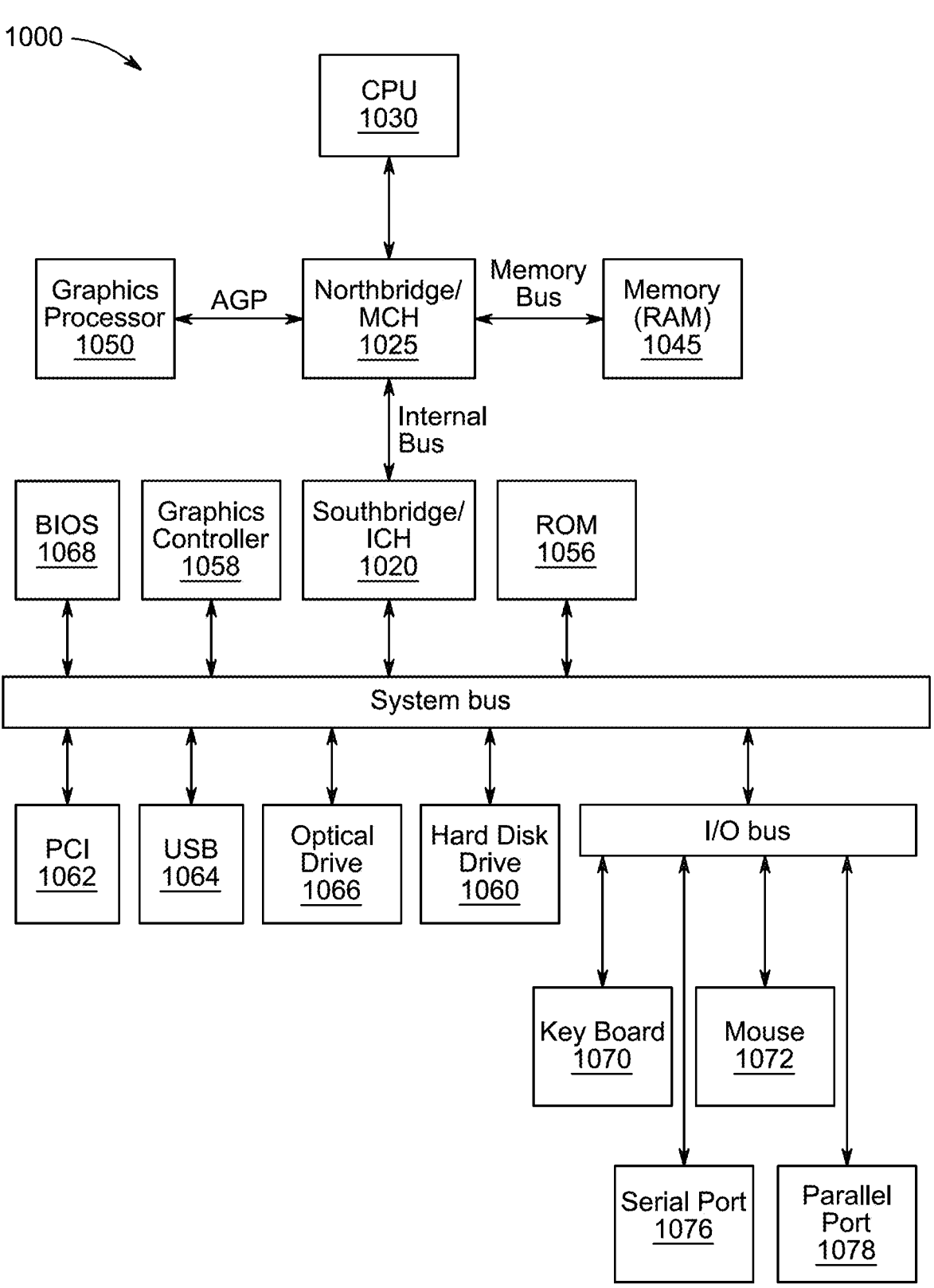
FIG. 10 is an exemplary schematic diagram of a data processing system used within the computing system, according to certain embodiments.

FIG. 10 shows a schematic diagram of a data processing system, according to certain embodiments, for performing the functions of the exemplary embodiments. The data processing system is an example of a computer in which code or instructions implementing the processes of the illustrative embodiments may be located.

Figure 11:
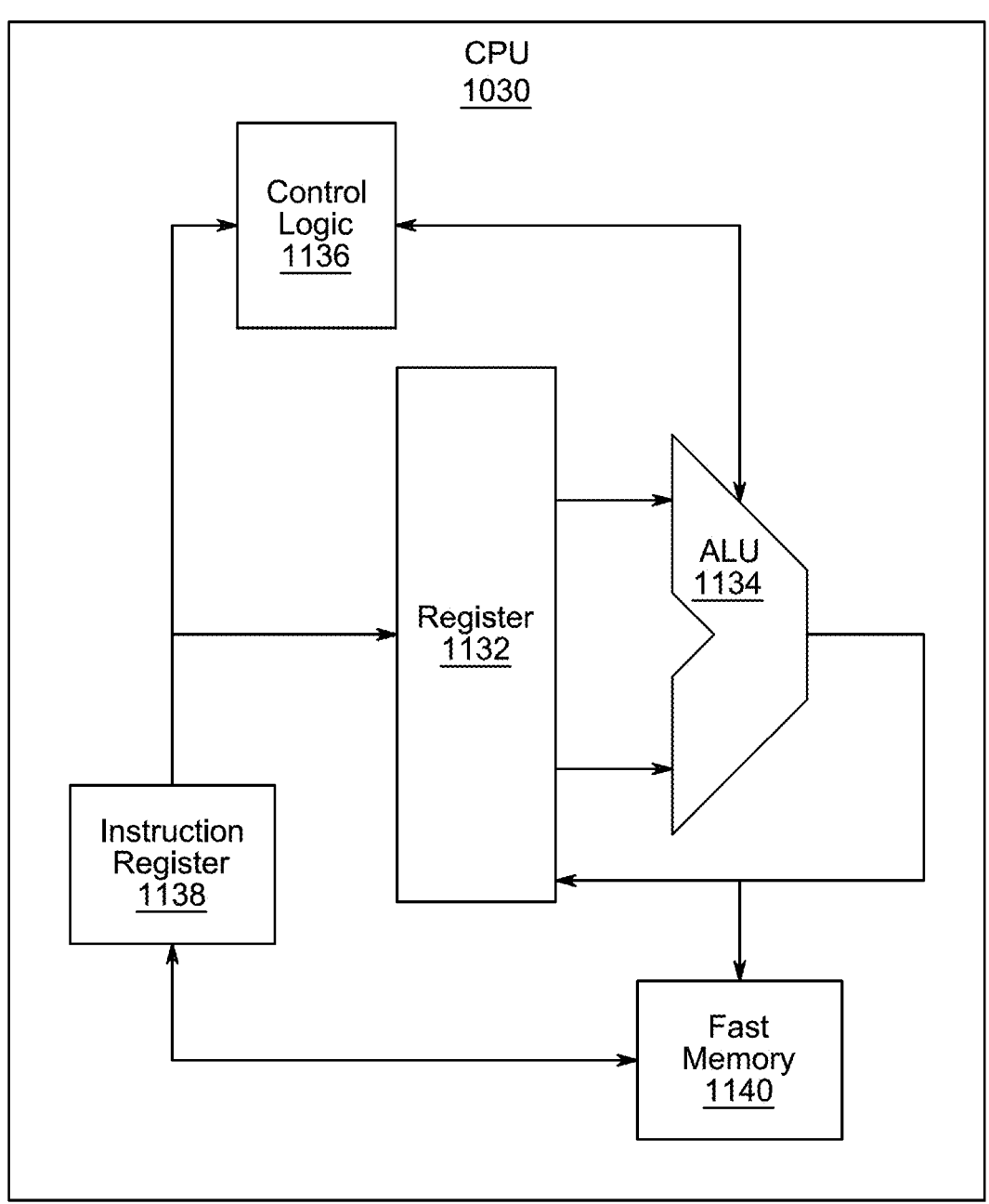
FIG. 11 is an exemplary schematic diagram of a processor used with the computing system, according to certain embodiments.

For example, FIG. 11 shows one implementation of CPU 1030. In one implementation, an instruction register 1138 retrieves instructions from a fast memory 1140. At least part of these instructions are fetched from the instruction register 1138 by a control logic 1136 and interpreted according to the instruction set architecture of the CPU 1030. Part of the instructions can also be directed to a register 1132.

In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be fed back into the register 1132 and/or stored in the fast memory 1140.

According to certain implementations, the instruction set architecture of the CPU 1030 can use a reduced instruction set architecture, a complex instruction set architecture, a vector processor architecture, or a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

Referring back to FIG. 10, the data processing system 1000 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 1045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU 1030 may contain one or more processors and even may be implemented using one or more heterogeneous processor systems.

Referring again to FIG. 10, the data processing system 1000 can include that the SB/ICH 1020 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 1020 through a PCI bus 1062.

The PCI devices may include, for example, Ethernet adapters, add-in cards, and PC cards for notebook computers. The Hard disk drive 1060 and optical drive or CD-ROM 1066 can use, for example, an integrated drive electronics (IDE) or serial advanced technology attachment (SATA) interface. In one implementation the I/O bus can include a super I/O (SIO) device.

Further, the hard disk drive (HDD) 1060 and optical drive 1066 can also be coupled to the SB/ICH 1020 through a system bus. In one implementation, a keyboard 1070, a mouse 1072, a parallel port 1078, and a serial port 1076 can be connected to the system bus through the I/O bus. Other peripherals and devices that can be connected to the SB/ICH 1020 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 12:
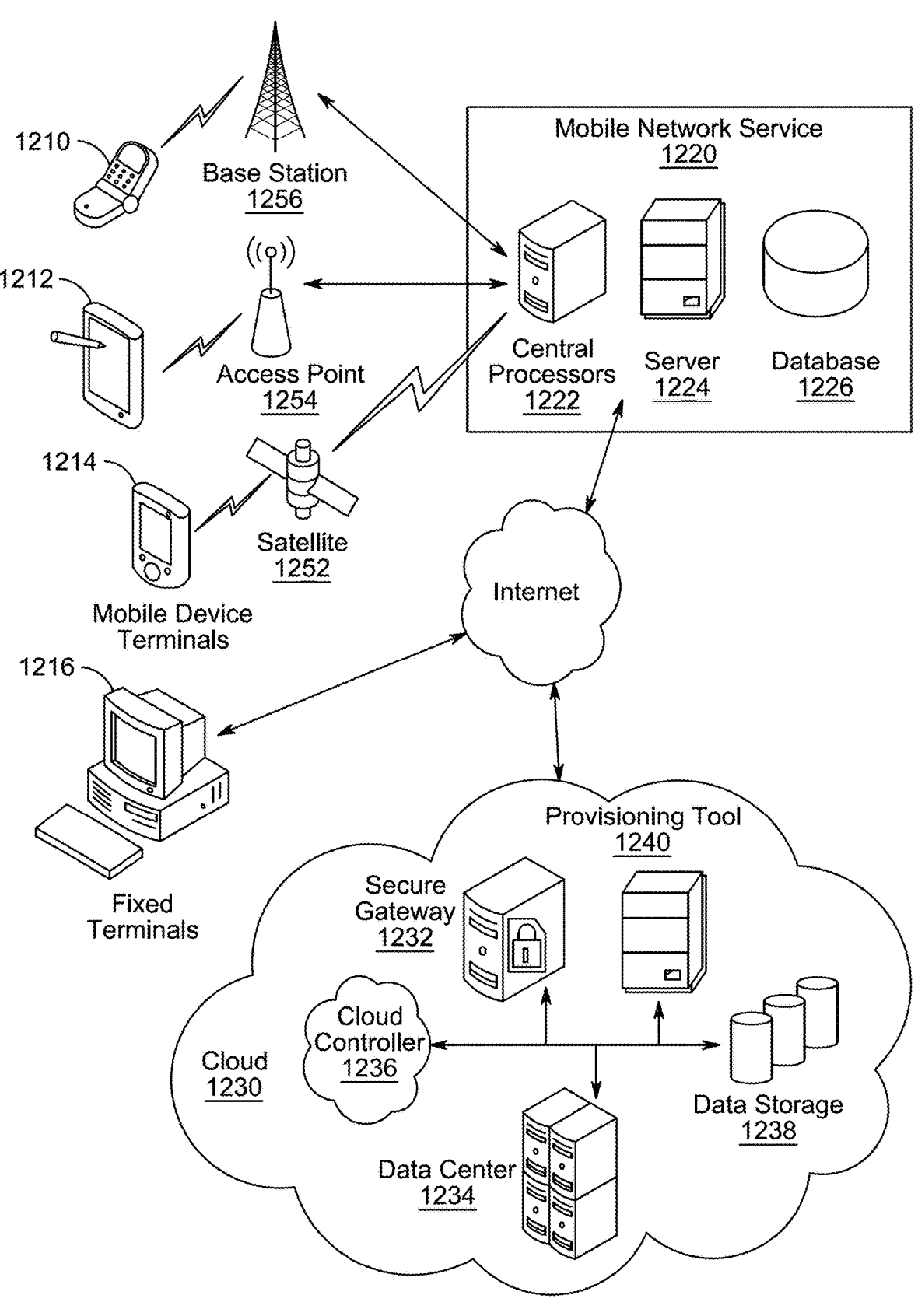
FIG. 12 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1230 including a cloud controller 1236, a secure gateway 1232, a data center 1234, data storage 1238 and a provisioning tool 1240, and mobile network services 1220 including central processors 1222, a server 1224 and a database 1226, which may share processing, as shown by FIG. 12, in addition to various human interface and communication devices (e.g., display monitors 1216, smart phones 1210, tablets 1212, personal digital assistants (PDAs) 1214). The network may be a private network, such as a LAN, satellite 1252 or WAN 1254, or be a public network such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A method for transitioning a distributed ledger to a post-quantum authorization, comprising:
   defining a first activation block height (h1) to initiate a soft fork and a second activation block height (h2) greater than the first activation block height;
   validating, for each block (b) at a block height H, each transaction in the block (b) by applying a height-based rule set that comprises:
       validating, when H<h1, that each input ledger unit referenced by the transaction is authorized under a classical digital signature scheme;
       validating, when h1≤H≤h2, that each input ledger unit referenced by the transaction is authorized under either the classical digital signature scheme or a post-quantum digital signature scheme and validating that each output ledger unit created by the transaction is authorized under the post-quantum digital signature scheme; and
       validating, when H>h2, that each input ledger unit referenced by the transaction is authorized under the post-quantum digital signature scheme; and
   committing the block (b) to the distributed ledger when each transaction in the block (b) satisfies the height-based rule set or rejecting the block (b) otherwise.

2. The method of claim 1, wherein each ledger unit, including an input ledger unit and an output ledger unit, comprises a blockchain-tracked unit including a digital coin or an application token.

3. The method of claim 1, further comprising verifying, for each input ledger unit of each transaction, that the input ledger unit is unspent on the distributed ledger before treating the transaction as valid.

4. The method of claim 1, further comprising determining whether a ledger unit is authorized under the classical digital signature scheme or the post-quantum digital signature scheme based on the block height at which the ledger unit was created relative to the first activation block height (h1).

5. The method of claim 1, further comprising:
   treating each unspent ledger unit authorized under the classical digital signature scheme as expired at block height h2; and
   rejecting each transaction that references an expired ledger unit as an input after block height h2.

6. The method of claim 5, further comprising adjusting a block reward after block height h2 by an amount corresponding to the expired ledger units authorized under the classical digital signature scheme.

7. The method of claim 1, further comprising announcing to a plurality of network peers an expected expiration date for ledger units authorized under the classical digital signature scheme, the expected expiration date being based on an expected date at which block height h2 is reached.

8. The method of claim 1, further comprising converting, during h1≤H≤h2, each ledger unit authorized under the classical digital signature scheme into a ledger unit authorized under the post-quantum digital signature scheme by initiating a self-transfer to a post-quantum address.

9. The method of claim 1, wherein the post-quantum digital signature scheme comprises one of a hash-based scheme, a lattice-based scheme, a code-based scheme, a multivariate scheme, and an isogeny-based scheme.

10. The method of claim 1, further comprising tracking non-currency application tokens and applying the height-based rule set to state updates representing at least one of supply-chain provenance, smart-contract state, e-government services, digital-identity credentials and healthcare records.

11. A system for transitioning a distributed ledger to post-quantum authorization, comprising one or more processors and a memory storing instructions that, when executed by the one or more processors, cause the system to:
   define a first activation block height (h1) to initiate a soft fork and a second activation block height (h2) greater than the first activation block height;
   validate, for each block (b) at a block height H, each transaction in the block (b) by applying a height-based rule set that comprises:
       validating, when H<h1, that each input ledger unit referenced by the transaction is authorized under a classical digital signature scheme;
       validating, when h1≤H≤h2, that each input ledger unit referenced by the transaction is authorized under either the classical digital signature scheme or a post-quantum digital signature scheme and validating that each output ledger unit created by the transaction is authorized under the post-quantum digital signature scheme; and validating, when $H>h2$, that each input ledger unit referenced by the transaction is authorized under the post-quantum digital signature scheme; and commit the block (b) to the distributed ledger when each transaction in the block (b) satisfies the height-based rule set or reject the block (b) otherwise.

12. The system of claim 11, wherein each ledger unit including an input ledger unit and an output ledger unit comprises a blockchain-tracked unit including a digital coin or an application token.

13. The system of claim 11, wherein the one or more processors are further configured to verify, for each input ledger unit of each transaction, that the input ledger unit is unspent on the distributed ledger before treating the transaction as valid.

14. The system of claim 11, wherein the one or more processors are further configured to determine whether a ledger unit is authorized under the classical digital signature scheme or the post-quantum digital signature scheme based on the block height at which the ledger unit was created relative to the first activation block height (h1).

15. The system of claim 11, wherein the one or more processors are further configured to:

treat each unspent ledger unit authorized under the classical digital signature scheme as expired at block height h2; and reject each transaction that references an expired ledger unit as an input after block height h2.

16. The system of claim 15, wherein the one or more processors are further configured to adjust a block reward after block height h2 by an amount corresponding to the expired ledger units authorized under the classical digital signature scheme.

17. The system of claim 11, wherein the one or more processors are further configured to announce to a plurality of network peers an expected expiration date for ledger units authorized under the classical digital signature scheme, the expected expiration date being based on an expected date at which block height h2 is reached.

18. The system of claim 11, wherein the one or more processors are further configured to convert, during $h1 \leq H \leq h2$, each ledger unit authorized under the classical digital signature scheme into a ledger unit authorized under the post-quantum digital signature scheme by initiating a self-transfer to a post-quantum address.

19. The system of claim 11, wherein the post-quantum digital signature scheme comprises one of a hash-based scheme, a lattice-based scheme, a code-based scheme, a multivariate scheme, and an isogeny-based scheme.

20. The system of claim 11, wherein the one or more processors are further configured to track non-currency application tokens and apply the height-based rule set to state updates representing at least one of supply-chain provenance, smart-contract state, e-government services, digital-identity credentials, and healthcare records.

* * * * *